United States Patent
Taki (10) Patent No.: US 10,024,589 B2
(45) Date of Patent: Jul. 17, 2018

(54) AIR CONDITIONER HAVING DEFROSTING OPERATION

(71) Applicant: FUJITSU GENERAL LIMITED, Kanagawa (JP)

(72) Inventor: Eiji Taki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 211 days.

(21) Appl. No.: 15/059,504

(22) Filed: Mar. 3, 2016

(65) Prior Publication Data

US 2016/0258661 A1 Sep. 8, 2016

(30) Foreign Application Priority Data

Mar. 4, 2015 (JP) .................................. 2015-042533

(51) Int. Cl.
*F25B 13/00* (2006.01)
*F25B 47/02* (2006.01)
(Continued)

(52) U.S. Cl.
CPC ............ *F25B 47/025* (2013.01); *F25B 13/00* (2013.01); *F25B 41/046* (2013.01); *F25B 49/02* (2013.01);
(Continued)

(58) Field of Classification Search
CPC ............ F25B 47/025; F25B 2313/0315; F25B 2700/21175; F25B 47/006; F25B 47/02;
(Continued)

(56) References Cited

U.S. PATENT DOCUMENTS 5,156,010 A * 10/1992 Inoue .................... F25B 47/025
165/240
5,257,506 A * 11/1993 DeWolf ................ F25D 21/006
62/155
(Continued)

FOREIGN PATENT DOCUMENTS

EP 2157380 A1 2/2010
EP 2770279 A1 8/2014
(Continued)

OTHER PUBLICATIONS

Jul. 20, 2016, EP communication issued for related EP application No. 16157838.0.
(Continued)

*Primary Examiner* — David Teitelbaum
*Assistant Examiner* — Nelson Nieves
(74) *Attorney, Agent, or Firm* — Paratus Law Group, PLLC (57) ABSTRACT

CPU of an air conditioner reads out a heat exchanger outlet temperature stored in time series into a memory part to check whether the current heat exchanger outlet temperature is a second threshold temperature or lower or not, whether the drop rate of the heat exchanger outlet temperature calculated using the latest heat exchanger outlet temperature and the second-to-the-latest heat exchanger outlet temperature is a specific drop rate or higher or not, and whether the number of indoor units in operation of indoor units has increased or not during calculation of the drop rate of the heat exchanger outlet temperature. And, when the second frost forming condition is satisfied, CPU switches a four-way valve to set a refrigerant circuit into a cooling cycle to thereby execute a defrosting operation preparation processing and, on completing the defrosting operation preparation (Continued)

processing, resumes a compressor to start a defrosting operation.

2 Claims, 4 Drawing Sheets

(51) Int. Cl.
*F25B 49/02* (2006.01)
*F25B 41/04* (2006.01)
*G05B 15/02* (2006.01)

(52) U.S. Cl.
CPC ............ *F25B 49/022* (2013.01); *G05B 15/02* (2013.01); *F25B 2313/0233* (2013.01); *F25B 2313/0315* (2013.01); *F25B 2600/01* (2013.01); *F25B 2600/021* (2013.01); *F25B 2600/0253* (2013.01); *F25B 2700/1931* (2013.01); *F25B 2700/1933* (2013.01); *F25B 2700/2106* (2013.01); *F25B 2700/2116* (2013.01); *F25B 2700/21151* (2013.01); *F25B 2700/21152* (2013.01); *F25B 2700/21174* (2013.01); *F25B 2700/21175* (2013.01); *Y02B 30/741* (2013.01)

(58) Field of Classification Search
CPC .......... F25B 47/022; F25B 2313/02332; F25B 2347/02; F24F 2011/0087; F24F 2011/0089
See application file for complete search history.

(56) References Cited

U.S. PATENT DOCUMENTS

| | | | | | |
|---|---|---|---|---|---|
| 5,319,943 | A | * | 6/1994 | Bahel | F24F 1/0003 62/156 |
| 5,809,789 | A | * | 9/1998 | Baker | F25B 47/022 62/156 |
| 5,927,083 | A | * | 7/1999 | Guo | F25D 21/006 62/155 |
| 5,931,009 | A | * | 8/1999 | Choi | F24F 11/0086 62/154 |
| 6,012,294 | A | * | 1/2000 | Utsumi | F25B 13/00 62/156 |
| 6,508,072 | B1 | * | 1/2003 | Kanazawa | F04B 49/20 236/78 D |
| 2003/0019944 | A1 | * | 1/2003 | Nonaka | F24F 11/006 236/51 |
| 2009/0266093 | A1 | | 10/2009 | Aoki | |
| 2011/0146339 | A1 | * | 6/2011 | Yamashita | F24F 3/06 62/513 |
| 2011/0154844 | A1 | * | 6/2011 | Lee | F25B 7/00 62/278 |
| 2012/0291460 | A1 | * | 11/2012 | Aoyagi | F25B 47/025 62/79 |
| 2013/0180269 | A1 | * | 7/2013 | Nagata | F24F 11/0086 62/81 |
| 2013/0192284 | A1 | * | 8/2013 | Kawai | F25D 21/06 62/156 |
| 2015/0027144 | A1 | * | 1/2015 | Lee | F25B 47/025 62/80 |
| 2015/0204592 | A1 | * | 7/2015 | Iwasaki | F24F 11/006 62/156 |
| 2015/0300723 | A1 | * | 10/2015 | Tsukino | F25B 47/025 62/128 |
| 2017/0038125 | A1 | * | 2/2017 | Tani | F24F 11/02 |
| 2017/0268811 | A1 | * | 9/2017 | Ochiai | F25B 49/02 |
| 2017/0284717 | A1 | * | 10/2017 | Suzuki | F25B 47/025 |

FOREIGN PATENT DOCUMENTS

| | | |
|---|---|---|
| JP | 2009-228928 | 10/2009 |
| WO | WO 2015/015814 A1 | 2/2015 |

OTHER PUBLICATIONS

Nov. 18, 2016, EP communication issued for related EP application No. 16157838.0.

\* cited by examiner

AIR CONDITIONER HAVING DEFROSTING OPERATION

CROSS-REFERENCE TO RELATED APPLICATION

The present application claims the benefit of priority of Japanese Patent Application No. 2015-042533, filed on Mar. 4, 2015, which is incorporated herein by reference.

TECHNICAL FIELD

The invention relates to an air conditioner with a plurality of indoor units connected to an outdoor unit by refrigerant pipes.

BACKGROUND

While an air conditioner is performing a heating operation, frost formation can occur in an outdoor heat exchanger functioning as an evaporator. Frost formation in the outdoor heat exchanger raises a fear that such frost can obstruct ventilation in the outdoor heat exchanger to thereby lower the heat exchange efficiency of the outdoor heat exchanger. Thus, there is proposed an air conditioner which, when frost is formed in the outdoor heat exchanger, interrupts a heating operation and, by switching a refrigerant circuit to allow the outdoor heat exchanger to function as a condenser, applies a high-temperature refrigerant discharged from a compressor to the outdoor heat exchanger to thereby perform a defrosting operation to melt the frost attached to the outdoor heat exchanger (see, for example, JPA publication No. 2009-228928).

In the above air conditioner, frost formation in the outdoor heat exchanger during the heating operation is checked using values detected by various temperature sensors or the duration of the heating operation. For example, when the temperature of a refrigerant flowing out from the outdoor heat exchanger during a heating operation, namely, the heat exchanger outlet temperature is lower than −14° C., or when a temperature difference between the outdoor air temperature and heat exchanger outlet temperature is larger than 5° C., or when the duration of the heating operation exceeds three hours, etc., the amount of frost formed in the outdoor heat exchanger is determined to be a level interfering with the heating capacity, thereby executing a defrosting operation.

Meanwhile, when the outdoor air temperature during the heating operation is low and the humidity of the outdoor air is high, frost formation can progress suddenly in the outdoor heat exchanger (a large amount of frost can attach to the outdoor heat exchanger for a short time). Such sudden frost formation progress cannot be detected by the above-mentioned frost formation checking method. Then, it is expected that frost formation sudden progress in the outdoor heat exchanger is checked by detecting the sudden temperature drop of the outdoor heat exchanger. For example, supposing the heat exchanger outlet temperature is checked periodically (for example, every five minutes). In the case that the checked temperature is lower than −6° C., when the drop rate of the heat exchanger outlet temperature obtained by subtracting the current heat exchanger outlet temperature from the previously (five minutes earlier) detected exchanger outlet temperature is larger than 2° C./5 min., it is determined that frost formation has progressed suddenly in the outdoor heat exchanger, thereby executing the defrosting operation.

In an air conditioner with a plurality of indoor units connected to an outdoor unit, during the heating operation, the number of indoor units in operation can increase (indoor unit(s) not operated so far can start heating operation(s)). When the number of indoor units in operation increases, the number of rotations of a compressor is increased according to the increased number of indoor units. The increased value of the then rotation number, even when only one indoor unit is increased, is larger than a value when a normal required capacity is changed (for example, when the set temperature in the indoor unit is increased by 1° C.). And, when the rotation number increased value of the compressor is large, the suction pressure of the compressor drops greatly and the heat exchanger exit temperature also greatly drops accordingly. Therefore, during the heating operation, when the number of indoor units in operation increases while checking from the above-mentioned drop rate of the heat exchanger outlet temperature whether frost formation has suddenly progressed in the outdoor heat exchanger or not, the drop rate of the heat exchanger outlet temperature increases although frost formation has not actually progressed suddenly in the outdoor heat exchanger, thereby raising a fear of determining in error that frost formation has progressed suddenly.

SUMMARY OF THE INVENTION

An object of the present invention is to provide an air conditioner which can check without error whether frost formation has suddenly progressed in an outdoor heat exchanger or not.

The air conditioner of the present invention being capable of solving the above problems comprises: an outdoor unit including a compressor, a four-way valve, an outdoor heat exchanger, a heat exchanger outlet temperature detector for detecting a heat exchanger outlet temperature providing the temperature of a refrigerant flowing out from the outdoor heat exchanger when the outdoor heat exchanger functions as an evaporator, and an outdoor air temperature detector for detecting an outdoor air temperature; a plurality of indoor units respectively including indoor heat exchangers; a refrigerant circuit constituted of the compressor, four-way valve, outdoor heat exchanger and indoor heat exchangers connected to each other by refrigerant pipes; and, a control unit for controlling the compressor and four-way valve. The control unit, while the plurality of indoor units are performing a heating operation with the refrigerant circuit set in a heating cycle, inputs periodically heat exchanger outlet temperatures detected by the heat exchanger outlet temperature detector and outdoor air temperatures detected by the outdoor air temperature detector or the number of the indoor units performing the heating operation, and stores them in time series. And, when any one of first and second frost forming conditions serving as the condition for frost formation in the outdoor heat exchanger is satisfied, the control unit switches the four-way valve to set the refrigerant circuit into a cooling cycle to thereby execute a defrosting operation for defrosting the outdoor heat exchanger. Here, the first frost forming condition is satisfied when the heat exchange outlet temperature is lower than a first threshold temperature, when the duration of the heating operation is longer than a specific duration, or when a temperature difference between the outdoor air temperature and heat exchanger outlet temperature is larger than a specific temperature difference. Also, the second frost forming condition is satisfied when, of the heat exchanger outlet temperatures stored in time series, the latest heat exchanger outlet temperature is lower than a second threshold temperature higher than the first threshold temperature, a function for checking whether the drop rate of the heat exchanger outlet temperature calculated using two continuing heat exchanger outlet temperatures of the heat exchanger outlet temperatures stored in time series is larger than a specific drop rate, and when the number of indoor units in operation has increased during calculation of the drop rate or when the increase rate of the number of rotations of the compressor during calculation of the drop rate of the heat exchanger outlet temperature is smaller than a specific increase rate.

The above-structured air conditioner of the present invention checks whether frost has been formed in the outdoor heat exchanger or not by checking the heat exchanger outlet temperature of the outdoor heat exchanger during the heating operation and the drop rate of the heat exchanger outlet temperature and also by checking whether the number of indoor units performing the heating operation has increased or not or checking the increase ratio of the number of rotations of the compressor during the heating operation, thereby being able to check with no error whether frost formation has progressed suddenly in the outdoor heat exchanger.

BRIEF DESCRIPTION OF THE DRAWINGS

FIG. 1A and FIG. 1B are explanatory views of an air conditioner according to an embodiment of the present invention.

DETAILED DESCRIPTION

Description is given below specifically of embodiments of the present invention with reference to the accompanying drawings. For the embodiments, description is given of an air conditioner, as an example, in which three indoor units are connected in parallel to one outdoor unit by refrigerant pipes and all indoor units can simultaneously perform a cooling operation or a heating operation. Here, the present invention is not limited to the following embodiments but can be changed variously without departing from the subject matter thereof.

Embodiment 1

Figure 1A:
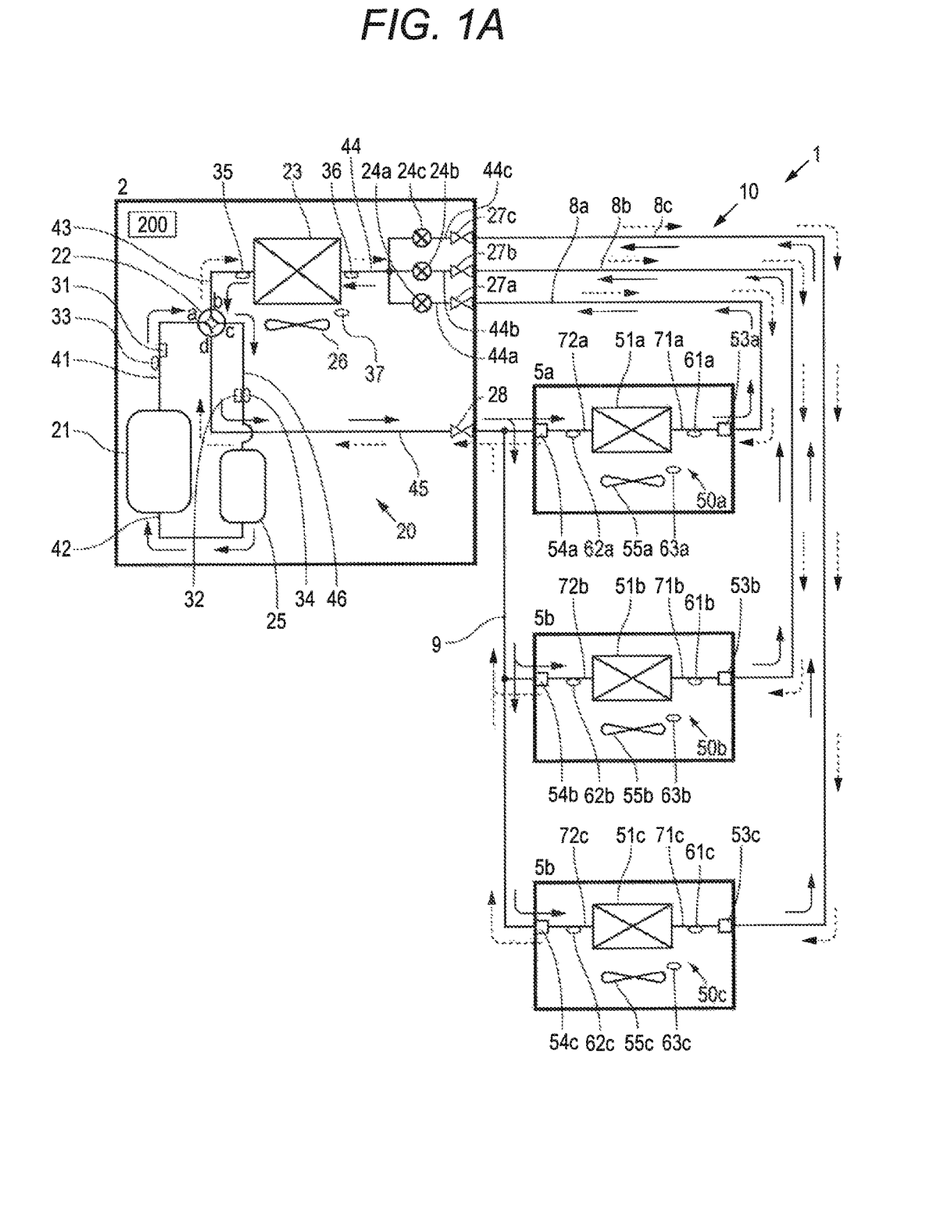
FIG. 1A is a refrigerant circuit diagram and FIG. 1B is a block diagram of an outdoor unit control unit.

As shown in FIG. 1A, an air conditioner 1 of this embodiment includes one outdoor unit 2 and three indoor units 5a~5c respectively connected to the outdoor unit 2 in parallel by a first liquid pipe 8a, a second liquid pipe 8b, a third pipe 8c and a gas pipe 9.

The above composing elements are connected as follows. One end of the first liquid pipe 8a is connected to a first liquid side closing valve 27a of the outdoor unit 2, while the other end is connected to a liquid pipe connecting part 53a of the indoor unit 5a. One end of the second liquid pipe 8b is connected to a second liquid side closing valve 27b of the outdoor unit 2, while the other end is connected to a liquid pipe connecting part 53b of the indoor unit 5b. One end of the third liquid pipe 8c is connected to a third liquid side closing valve 27c of the outdoor unit 2, while the other end is connected to a liquid pipe connecting part 53c of the indoor unit 5c. One end of the gas pipe 9 is connected to a gas side closing valve 28 of the outdoor unit 2, while the other end is branched, while the branched parts are respectively connected to the gas pipe connecting parts 54a~54c of the indoor units 5a~5c. The outdoor unit 2 and indoor units 5a~5c are connected together by the first, second and third liquid pipes 8a, 8b and 8c and gas pipe 9 in this manner, thereby constituting a refrigerant circuit 10 of the air conditioner 1.

The outdoor unit 2 includes a compressor 21, a four-way valve 22, an outdoor heat exchanger 23, a first expansion valve 24a, a second expansion valve 24b, a third expansion valve 24c, an accumulator 25, an outdoor fan 26, the above-mentioned closing valves 27a, 27b, 27c and 28, and an outdoor unit control unit 200. And, these devices, except for the outdoor fan 26 and outdoor unit control unit 200, are connected to each other by their associated refrigerant pipes (which are described later specifically), thereby constituting an outdoor unit refrigerant circuit 20 forming part of the refrigerant circuit 10.

The compressor 21 is a capacity-variable type compressor capable of varying the operation displacement thereof when driven by a motor (not shown) the number of rotations of which can be controlled by an inverter. The refrigerant outlet of the compressor 21 and the port a of the four-way valve 22 are connected to each other by a discharge pipe 41, while the refrigerant suction side of the compressor 21 and the refrigerant outlet side of the accumulator 25 are connected by a suction pipe 42.

The four-way valve 22 is a valve used to switch the flow direction of a refrigerant and includes four ports a, b, c and d. As described above, the port a is connected to the refrigerant outlet of the compressor 21 by the discharge pipe 41. The port b is connected to one of the refrigerant doorways of the outdoor heat exchanger 23 by a refrigerant pipe 43. The port c is connected to the refrigerant inlet side of the accumulator 25 by a refrigerant pipe 46. The port d is connected to the gas side closing valve 28 by an outdoor unit gas pipe 45.

The outdoor heat exchanger 23 is used to exchange heat between a refrigerant and the outdoor air sucked into the outdoor unit 2 from a suction port (not shown) by the rotation of the outdoor fan 26. As described above, one refrigerant doorway of the outdoor heat exchanger 23 is connected to the port b of the four-way valve 22 by the refrigerant pipe 43, while the other is connected to the one-side ends of a first liquid branch pipe 44a—a third liquid branch pipe 44c by an outdoor unit liquid pipe 44. The outdoor heat exchanger 23, when the refrigerant circuit 10 is set in a cooling cycle, functions as a condenser and, when the refrigerant circuit 10 is set in a heating cycle, functions as an evaporator.

The first expansion valve 24a is arranged on the first liquid branch pipe 44a. One end of the first liquid branch pipe 44a is connected to the outdoor unit liquid pipe 44, while the other end is connected to the first liquid side closing valve 27a. The second expansion valve 24b is arranged on the second liquid branch pipe 44b. One end of the second liquid branch pipe 44b is connected to the outdoor unit liquid pipe 44, while the other end is connected to the second liquid side closing valve 27b. The third expansion valve 24c is arranged on the third liquid branch pipe 44c. One end of the third liquid branch pipe 44c is connected to the outdoor unit liquid pipe 44, while the other end is connected to the third liquid side closing valve 27c.

The first, second and third expansion valves 24a, 24b and 24c are all controlled in opening by the outdoor unit control unit 200. By controlling opening of the first expansion valve 24a, the amount of refrigerant flowing into the indoor unit 5a can be adjusted. By controlling opening of the second expansion valve 24b, the amount of refrigerant flowing into the indoor unit 5b can be adjusted. By controlling opening of the third expansion valve 24c, the amount of refrigerant flowing into the indoor unit 5c can be adjusted. The first, second and third expansion valves 24a, 24b and 24c are electronic expansion valves which can be driven by a pulse motor (not shown) and the opening of which can be adjusted by the number of pulses to be given to the pulse motor.

As described above, the refrigerant inlet side of the accumulator 25 is connected to the port c of the four-way valve 22 by the refrigerant pipe 46 and the refrigerant outlet side thereof is connected to the refrigerant suction port of the compressor 21 by a suction pipe 42. The accumulator 25 divides the received refrigerants into a gas refrigerant and a liquid refrigerant and allows only the gas refrigerant to be sucked into the compressor 21 through the suction pipe 42.

The outdoor fan 26 is a propeller fan formed of resin and arranged near the outdoor heat exchanger 23. When it is rotated by a fan motor (not shown), it sucks the outdoor air into the outdoor unit 2 from a suction port (not shown) formed in the outdoor unit 2 and, after the air exchanges heat with a refrigerant flowing in the outdoor heat exchanger 23, discharges the air outside the outdoor unit 2 from a blowoff port (not shown) formed in the outdoor unit 2.

Besides the above-mentioned structure, various sensors are arranged in the outdoor unit 2. As shown in FIG. 1A, the discharge pipe 41 includes a high pressure sensor 31 for detecting the pressure of a refrigerant discharged from the compressor 21 and a discharge temperature sensor 33 for detecting the temperature of a refrigerant discharged from the compressor 21. The refrigerant pipe 46 includes, near the refrigerant inlet side of the accumulator 25, a low pressure sensor 32 for detecting the pressure of a refrigerant sucked into the compressor 21 and a suction temperature sensor 34 for detecting the temperature of a refrigerant sucked into the compressor 21.

The refrigerant pipe 43 includes, near the outdoor heat exchanger 23, a refrigerant temperature sensor 35 serving as a heat exchange outlet temperature detector for detecting the temperature of a refrigerant flowing out from the outdoor heat exchanger 23 when it functions as an evaporator. The outdoor liquid pipe 44 includes a refrigerant temperature sensor 36 for detecting the temperature of a refrigerant flowing into the outdoor heat exchanger 23 when it functions as an evaporator. The outdoor unit 2 includes, near a suction port (not shown), an outdoor temperature sensor 37 serving as an outdoor air temperature detector for detecting the temperature of the outdoor air flowing into the outdoor unit 2, that is, the outdoor air temperature.

Figure 1B:
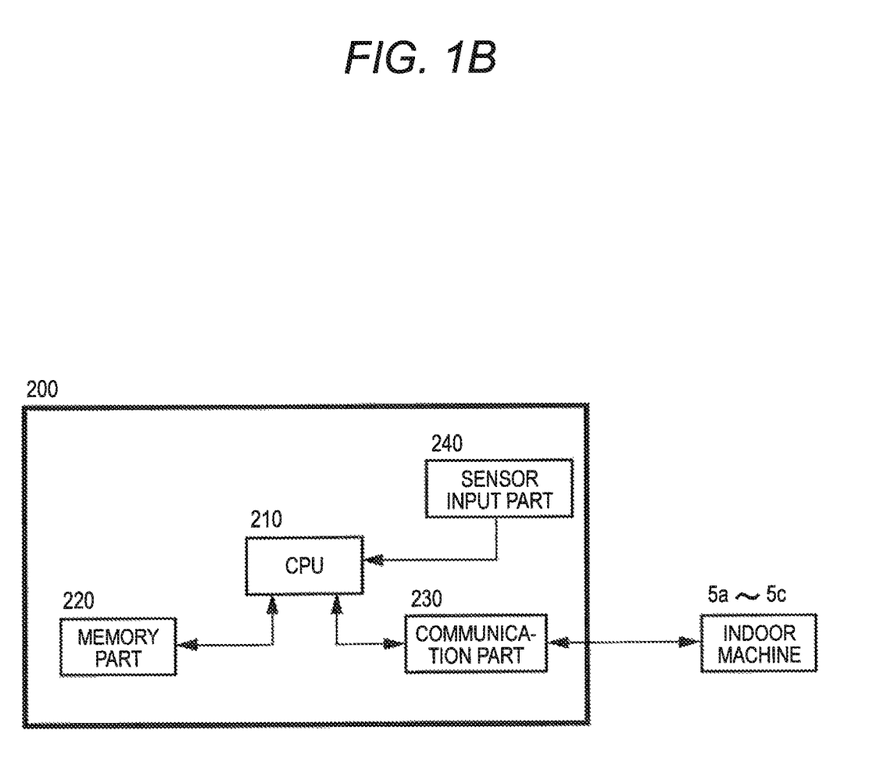

The outdoor unit 2 includes the outdoor unit control unit 200 which is carried on a control substrate stored in an electric component box (not shown) of the outdoor unit 2 and includes, as shown in FIG. 1B, a CPU 210, a memory part 220, a communication part 230 and a sensor input part 240.

The memory part 220 is constituted of a ROM, a RAM, etc. and stores detection values corresponding to detection signals from the control program and various sensors of the outdoor unit 2, the drive conditions of the compressor 21 and outdoor fan 26, and the operation information on the indoor units 5a~5c (including operation/stop information and set temperature information, etc.) transmitted from these units.

The communication part 230 is an interface for performing communication with the indoor units 5a~5c. The sensor input part 240 inputs the detection results of the various sensors of the outdoor unit 2 and outputs them to the CPU 210. The CPU 210 receives the detection values of the various sensors periodically (for example, every five minutes) through the sensor input part 240. The CPU 210 also receives operation information signals including operation start/stop signals and operation information (set temperatures, indoor temperatures, etc.) transmitted from the indoor units 5a~8c through the communication part 230. The CPU 210, according to the input various information, controls opening of the first~third expansion valves 24a~24c and driving of the compressor 21 and outdoor fan 26. Although not shown, The CPU 210 has a timer measuring function.

Next, description is given of the three indoor units 5a~5c. They respectively include indoor heat exchangers 51a~51c, liquid pipe connecting parts 53a~53c, gas pipe connecting parts 54a~54c and indoor fans 55a~55c. These components, except for the indoor fans 55a~55c, are connected to each other by their associated refrigerant pipes (to be discussed later specifically), thereby constituting indoor unit refrigerant circuits 50a~50c forming part of the refrigerant circuit 10.

Here, since the indoor units 5a~5c are the same in structure, in the following description, only the structure of the indoor unit 5a is described, while the description of other indoor units 5b, 5c is omitted. Also, in FIG. 1A, when the end (a) of the numeral given to the structure of the indoor unit 5a is changed to b and c, there are provided the structures of the indoor units 5b and 5c corresponding to the structure of the indoor unit 5a.

The indoor heat exchanger 51a is used to exchange heat between a refrigerant and the indoor air taken by the rotation of the indoor fan 55a into the indoor unit 5a from a suction port (not shown) formed in the indoor unit 5a. One refrigerant doorway of the indoor heat exchanger 51a is connected to a liquid pipe connecting part 53a by an indoor unit liquid pipe 71a, while the other is connected to a gas pipe connecting part 54a by an indoor unit gas pipe 72a. Here, to the liquid piper connecting part 53a and gas pipe connecting part 54a, there are connected their associated refrigerant pipes by flare nuts, etc.

The indoor heat exchanger 51a, when the indoor unit 5a performs a cooling operation, functions as an evaporator and, for a heating operation, functions as a condenser.

The indoor fan 55a is a resin-made cross flow fan arranged near the indoor heat exchanger 51a and, when rotated by a fan motor (not shown), it sucks the indoor air into the indoor unit 5a from a suction port (not shown) and, after heat exchange with a refrigerant in the indoor heat exchanger 51a, supplies the indoor air into the inside of a room from a blowoff port (not shown) formed in the indoor unit 5a.

Besides the above-described structure, various sensors are arranged in the indoor unit 5a. The indoor unit liquid pipe 71a includes a liquid side temperature sensor 61a for detecting the temperature of a refrigerant flowing into or flowing out from the indoor heat exchanger 51a. The indoor unit gas pipe 72a includes a gas side temperature sensor 62a for detecting the temperature of a refrigerant flowing out from or flowing into the indoor heat exchanger 51a. Near the suction port (not shown) of the indoor unit 5a, there is arranged an indoor temperature sensor 63a for detecting the temperature of the indoor air flowing into the indoor unit 5a, namely, the indoor temperature.

Next, using FIG. 1A, description is given of the flow of the refrigerant and the operations of the respective parts in the refrigerant circuit 10 when the air conditioner 1 of the embodiment performs a heating operation and, since any one of first and second frost forming conditions (to be discussed later) is satisfied during the heating operation, performs a defrosting operation. In the following description, the flow of the refrigerant and the operations of the respective parts in the refrigerant circuit 10 during the heating operation are described first and, after specific description of the first and second frost forming conditions, the flow of the refrigerant and the operations of the respective parts in the refrigerant circuit 10 during the defrosting operation are described next.

Here, in FIG. 1A, a solid-line arrow shows the flow of the refrigerant in the heating operation, while a broken-line arrow shows the flow of the refrigerant in the defrosting operation. However, the flow of the refrigerant from the compressor 21 to the port a of the four-way valve 22 and the flow of the refrigerant from the port c of the four-way valve 22 to the compressor 21 are the same in the heating and defrosting operations and thus are shown only by solid-line arrows. Also, for the four-way valve 22, communication states between the respective ports in the heating operation are shown by solid lines, while communication states between the respective ports in the defrosting operation are shown by broken lines.

<Heating Operation>

When the indoor units 5a~5c perform a heating operation, that is, when the refrigerant circuit 10 is set in a heating cycle, the CPU 210 of the outdoor unit control unit 200, as shown in FIG. 1A, switches the four-way valve 22 into a state shown by a solid line, that is, such that the ports a and d of the four-way valve communicate with each other and the ports b and c communicate with each other. Thus, the outdoor heat exchanger 23 functions as an evaporator and the indoor heat exchangers 51a~51c function as condensers. And, the CPU 210 drives the compressor 21 and outdoor fan 26.

When the compressor 21 is driven, the refrigerant circulates in the refrigerant circuit 10 like the solid arrow shown in FIG. 1A. That is, the high-pressure refrigerant discharged from the compressor 21 flows from the discharge pipe 41 into the four-way valve 22, flows from the four-way valve 22 into the outdoor unit gas pipe 45 and flows through the gas side closing valve 28 into the gas pipe 9. The refrigerant having flown into the gas pipe 9 branches off and flows through the gas pipe connecting parts 54a~54c into the indoor units 5a~5c. Refrigerants flown into the indoor units 5a~5c flow through the indoor unit gas pipes 72a~72c into the indoor heat exchangers 51a~51c, where they exchange heat with the indoor air taken into the indoor units 5a~5c by rotation of the indoor fans 55a~55c and are thereby condensed. Thus, the indoor heat exchangers 51a~51c function as condensers and the indoor air having exchanged heat with the refrigerants in the indoor heat exchangers 51a~51c is blown off into a room from the blowoff port (not shown), thereby heating the inside of the room equipped with the indoor units 5a~5c.

The refrigerants, which have flown out from the indoor heat exchangers 51a~51c, flow through indoor unit liquid pipes 71a~71c and flow into first~third liquid pipes 8a~8c through the liquid pipe connecting parts 53a~53c. The refrigerants, which have flown into the first~third liquid pipes 8a~8c, flow through the first~third liquid side closing valves 27a~27c into the outdoor unit 2 and, when flowing in the first~third liquid branch pipes 44a~44c, pass through the first~third expansion valves 24a~24c, thereby reducing the pressures thereof.

The refrigerants, the pressures of which have been reduced in the expansion valves, flow from the first~third liquid branch pipes 44a~44c into the outdoor unit liquid pipe 44 where they join together and, after then, they flow into the outdoor heat exchanger 23. The refrigerant, which has flown into the outdoor heat exchanger 23, exchanges heat with the outdoor air taken into the outdoor unit 2 by rotation of the outdoor fan 26, thereby evaporating. The refrigerant, which has flown out from the heat exchanger 23 into the refrigerant pipe 43, flows in the refrigerant pipe through the four-way valve 22 and flows into the accumulator 25, where it is divided into a gas refrigerant and a liquid refrigerant. The gas refrigerant flown out from the accumulator 25 flows in the suction pipe 42 and is sucked by the compressor 21, where it is compressed again.

<Defrosting Operation>

During the above-mentioned heating operation of the air conditioner 1, CPU 210 checks whether one of the first and second frost forming conditions (to be described below) is satisfied or not. And, when one of the first and second frost forming conditions is satisfied, CPU 210 controls the air conditioner 1 so that the air conditioner 1 interrupts the heating operation and performs a defrosting operation for defrosting the outdoor heat exchanger 23. For checking whether the first frost forming condition is satisfied or not, CPU 210 checks whether, during the heating operation, a heat exchanger outlet temperature showing a temperature to be detected by the refrigerant temperature sensor 35 and also showing the temperature of the outdoor heat exchanger 23 functioning as an evaporator is lower than a first threshold temperature (for example, −14° C.) or not, whether a temperature difference between the outdoor air temperature detected by the outdoor temperature sensor 37 and the heat exchanger outlet temperature is larger than a specific temperature difference (for example, 5° C.) or not, and whether the duration time of the heating operation is longer than a previously set specific duration time (for example, three hours) or not. For checking whether the second frost forming condition is satisfied or not, CPU 210 checks whether the heat exchanger outlet temperature is higher than the first threshold temperature and is lower than a second threshold temperature (for example, −6° C.) or not during the heating operation, whether a drop rate of the heat exchanger outlet temperature obtained by subtracting the current heat exchanger outlet temperature from the heat exchanger outlet temperature detected previously (five minutes ago) is larger than a specific drop rate (for example, 2° C./5 min.) or not, and whether, during the above calculation of the drop rate of the heat exchanger outlet temperature, the number of indoor units 5a~5c in operation has increased or not.

Here, the first frost forming condition is a condition indicating a fear that the amount of frost formed in the outdoor heat exchanger 23 provides a level capable of obstructing the heating capacity. Specifically, the first frost forming condition is satisfied when the heat exchanger outlet temperature is lower than a first threshold temperature (for example, −14° C.) during the heating operation, or when the temperature difference between the outdoor air temperature and the heat exchanger outlet temperature is larger than the specific temperature difference (for example, 5° C.), or when the duration of the heating operation is longer than the previously set specific duration (for example, three hours). Here, the CPU 210 inputs heat exchanger outlet temperatures detected by the refrigerant temperature sensor 35 and outdoor temperatures detected by the outdoor air temperature sensor 37 through the sensor input part 240 periodically, and stores the thus-input heat exchanger outlet temperatures and outdoor air temperatures into the memory part 220 in time series.

Meanwhile, the second frost forming condition is a condition indicating a fear that the amount of frost formed in the outdoor heat exchanger 23 can rapidly reach a level capable of obstructing the heating capacity. Specifically, the second frost forming condition is satisfied when the heat exchanger outlet temperature is higher than the first threshold temperature and is lower than a second threshold temperature (for example, −6° C.) during the heating operation, when the drop rate of the heat exchanger outlet temperature is larger than a specific drop rate (for example, 2° C./5 min.), and when the number of indoor units 5a~5c in operation has increased during the above calculation of the drop rate of the heat exchanger outlet temperature. Here, the number of indoor units 5a~5c in operation is obtained by the CPU 210 referring to operation/stop information included in the operation information on the indoor units 5a~5c transmitted from these units and stored in the memory part 220. The operation/stop information is transmitted whenever the indoor units 5a~5c are actuated or stopped and, on every reception of this information, the CPU 210 updates the operation/stop information stored in the memory part 220.

When the outdoor air temperature is low and the humidity is high during the heating operation, frost formation can suddenly progress in the outdoor heat exchanger 23 (a large amount of frost can be attached to the outdoor heat exchanger 23 in a short time). In this case, the check based on the above-mentioned first frost forming condition cannot determine whether the temperature of the outdoor heat exchanger 23 has dropped suddenly or not, thereby disabling detection of the sudden progress of frost formation in the outdoor heat exchanger 23. Thus, the drop rate of the heat exchanger outlet temperature may be calculated using the periodically detected heat exchanger outlet temperatures, and whether the heat exchanger outlet temperature is lower than the second threshold temperature or not and the drop rate of the heat exchanger outlet temperature is larger than the specific drop rate or not may be checked to determine whether the temperature of the outdoor heat exchanger 23 has dropped suddenly or not, thereby enabling detection of the sudden progress of frost formation in the outdoor heat exchanger 23.

Here, during the heating operation of the air conditioner 1, as any one of the indoor units 5a~5c starts to operate from the stopping state, that is, the number of indoor units in operation increases, the number of rotations of the compressor 21 increases accordingly. The then increasing value of the number of rotations of the compressor, even when the number of indoor units in operation increases is only one, is larger than the number at the time of the normal change of required capacity (for example, when the set temperature is increased by 1° in the indoor units 5a~5c). When the increasing value of the number of rotations of the compressor 21 is large, the suction pressure of the compressor 21 drops greatly, whereby the heat exchanger outlet temperature in the outdoor heat exchanger 23 drops greatly accordingly. Thus, when the above-mentioned number of indoor units in operation increases in detecting the sudden progress of frost formation using the drop rate of the heat exchanger outlet temperature, although the temperature of the outdoor heat exchanger 23 originally has not dropped greatly, the drop rate of the heat exchanger outlet temperature increases, there is a fear of determining in error that frost formation in the outdoor heat exchanger 23 has progressed suddenly.

Thus, according to the invention, as the above-mentioned second frost forming condition, besides a condition checking whether the heat exchanger outlet temperature is lower than the second threshold value or not and the drop rate of the heat exchanger outlet temperature is larger than the specific drop rate or not, there is included a condition checking whether the number of indoor units 5a~5c in operation has increased or not during calculation of the drop rate of the heat exchanger outlet temperature. Thus, even in the case of sudden drop of the heat exchanger outlet temperature, even when the number of indoor units 5a~5c in operation has increased, for example, by one to increase the number of rotations of the compressor 21 and thus increase the number of rotations of the compressor 21 accordingly, thereby causing the drop rate of the heat exchanger outlet temperature to exceed the specific drop rate, it is prevented to determine in error that frost formation has progress suddenly in the outdoor heat exchanger 23 and thereby start the defrosting operation.

When the first or second frost forming condition is satisfied, the CPU 210 interrupts the heating operation and performs a defrosting operation. The CPU 210 stops the compressor 21 and outdoor fan 26 and, as shown in FIG. 1A, switches the four-way valve 22 into a state shown by broken lines, that is, such that the ports a and b of the four-way valve 22 communicate with each other and the ports c and d communicate with each other. Thus, the outdoor heat exchanger 23 functions as a condenser and the indoor heat exchangers 51a~51c function as evaporators. And, the CPU 210 resumes the compressor 21 with the outdoor fan 26 remaining stopped.

When the compressor 21 resumes, as shown by the broken-line arrow in FIG. 1A, a refrigerant circulates in the refrigerant circuit 10. That is, a high-pressure refrigerant discharged from the compressor 21 flows from the discharge pipe 41 into the four-way valve 22, and flows from the four-way valve 22 through the refrigerant pipe 43 into the outdoor heat exchanger 23. This refrigerant melts frost attached to the outdoor heat exchanger 23 and flows out from outdoor the heat exchanger 23 to the outdoor unit liquid pipe 44. This refrigerant, in the outdoor unit liquid pipe 44, branches off into the first~third liquid branch pipes 44a~44c, passes through the full-opened first~third expansion valves 24a~24c, and flows through the first~third liquid side closing valves 27a~27c into the first~third liquid pipes 8a~5c.

After the refrigerant has flown from the first~third liquid pipes 8a~8c through the liquid pipe connecting parts 53a~53c into the indoor units 5a~5c, it flows through the indoor unit liquid pipes 71a~71c into the indoor heat exchangers 51a~51c, where it exchanges heat with the indoor air to thereby evaporate. Here, during the defrosting operation, the indoor fans 55a~55c are stopping. The refrigerant, after having flown from the indoor heat exchangers 51a~51c into the indoor unit gas pipes 72a~72c, flows through the gas pipe connecting parts 54a~54c into the gas pipe 9, and flows out from the gas pipe 9 through the gas side closing valve 28 into the outdoor unit 2. After having flown into the outdoor unit 2, the refrigerant flows through the outdoor unit gas pipe 45, four-way valve 22 and refrigerant pipe 46 into the accumulator 25, where it is divided into a gas refrigerant and a liquid refrigerant. After having flown out from the accumulator 25, the refrigerants flow through the suction pipe 42 and are sucked into the compressor 21, where they are compressed again.

Figure 2:
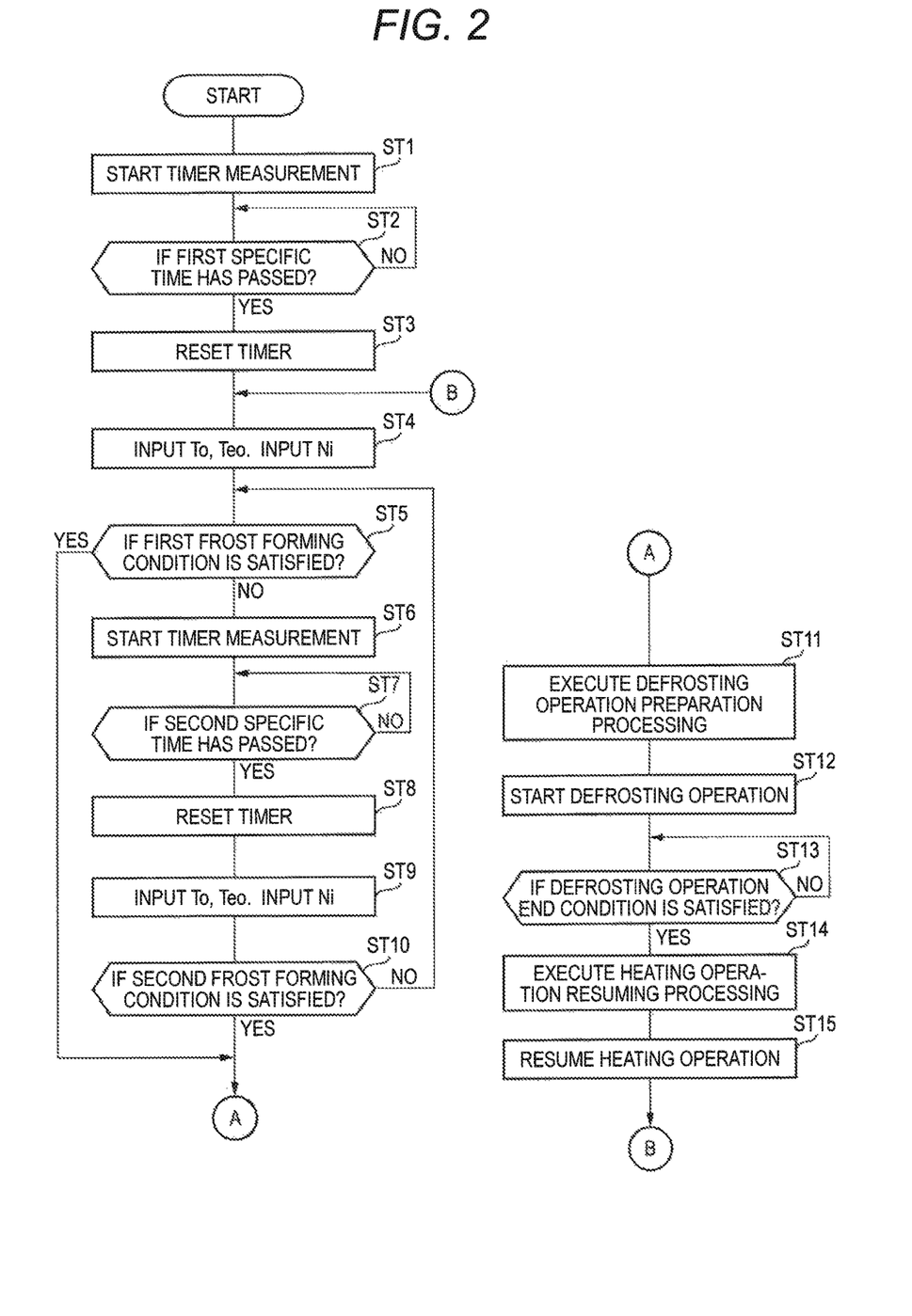
FIG. 2 is a flow chart of processings to be performed by the outdoor unit control unit in a heating operation according to the embodiment of the present invention.

Next, using a flow chart shown in FIG. 2, description is given of processings to be performed by the CPU 210 when the air conditioner 1 of the invention performs a heating operation. In the flow chart of FIG. 2, ST expresses the steps of the processings and numerals following this express the numbers of the steps. Here, in FIG. 2, processings relating to the invention are mainly described, whereas the description of other processings, namely, general processings relating to the air conditioner 1, for example, control according to an operating condition instructed by a user during a heating operation is omitted. Also, in the following description, the outdoor air temperature to be detected by the outdoor air temperature sensor 37 is expressed by To, the heat exchanger outlet temperature to be detected by the refrigerant temperature sensor 35 is expressed by Teo, and the number of indoor units in operation of the indoor units 5a~5c, that is, the operating unit number is expressed by Ni. Further, the first frost forming condition is defined to check whether the heat exchanger outlet temperature to be detected by the refrigerant temperature sensor 35 is equal to or lower than −14° C. that is the first threshold temperature, while the second threshold temperature of the second frost forming condition is defined as −6° C. and the specific drop rate is defined as 2° C./5 min.

When the heating operation is started, the CPU 210 starts timer measurement (ST1). Next, the CPU 210 checks whether a first specific time has passed or not after start of the timer measurement (ST2). Here, the first specific time is the time which has been previously obtained by conducting a test, etc. and stored in the memory part 220 and also which is necessary for the temperature and pressure of the refrigerant in the refrigerant circuit 10 to stabilize after start of the heating operation (for example 10 min).

When the specific time has not passed (ST2—No), the CPU 210 returns the processing to ST2. When passed (ST2—Yes), it resets a timer (ST3), and inputs through a sensor input part 240 the outdoor air temperature To detected by the outdoor air temperature sensor 37 and the heat exchanger outlet temperature Teo detected by the refrigerant temperature sensor 35, and inputs the current operating unit number Ni of the indoor units 5a~5b from the memory part 220 (ST4). When performing the processing of ST4, it stores the above-input outdoor air temperature To, heat exchanger outlet temperature Teo and operating unit number Ni of the indoor units 5a~5b together into the memory part 220.

Next, it checks whether the first frost forming condition is satisfied or not (ST5). Specifically, it reads out the heat exchanger outlet temperature Teo input in ST and stored in the memory part 220 and checks whether the heat exchanger outlet temperature Teo is equal to or lower than −14° C. or not.

When the first frost forming condition is satisfied (ST5—Yes), that is, when the heat exchanger outlet temperature Teo is lower than −14° C., when the temperature difference between the outdoor air temperature To and the heat exchanger outlet temperature Teo is larger than 5° C., or when the duration time of the heating operation is longer than three hours, it advances the processing to ST11. When not satisfied (ST5—No), that is, when the heat exchanger outlet temperature Teo is not lower than −14° C., when the temperature difference between the outdoor air temperature To and the heat exchanger outlet temperature Teo is not larger than 5° C., and when the duration time of the heating operation is not longer than three hours, it starts timer measurement (ST6) and checks whether a second specific time has passed after start second specific time of the timer measurement or not (ST7). Here, the second specific time is the time necessary to input the outdoor air temperature To detected by the outdoor air temperature sensor 37 and the heat exchanger outlet temperature Teo detected by the refrigerant temperature sensor 35, here five minutes.

When not passed (ST7—No), it returns the processing to ST7. When passed (ST7—Yes), it resets the timer (ST8), and it inputs through the sensor input part 240 the outdoor air temperature To detected by the outdoor air temperature sensor 37 and the heat exchanger outlet temperature Teo detected by the refrigerant temperature sensor 35 and inputs from the memory part 220 the current operating unit number Ni of the indoor units 5a~5b (ST9). Here, it also stores the above-input outdoor air temperature To, heat exchanger outlet temperature Teo and the number Ni of indoor units 5a~5b in operation together into the memory part 220.

Next, it checks whether the second frost forming condition is satisfied or not (ST10). Specifically, it reads out the heat exchanger outlet temperature Teo stored in the memory part 220 in ST4 and ST9, and checks whether the heat exchanger outlet temperature Teo stored in ST9 is equal to or lower than −6° C. or not, whether the drop rate of the heat exchanger outlet temperature calculated using the heat exchanger outlet temperature Teo stored in ST9 and the heat exchanger outlet temperature Teo stored in ST4 is equal to or more than 2° C./5 min. or not, and whether, by comparing the operating unit numbers of indoor units 5a~5c stored in ST4 and in ST9 with each other, the number of indoor units 5a~5c in operation has increased or not.

When not satisfied (ST10—No), that is, when the heat exchanger outlet temperature Teo is higher than −6° C., or the drop rate of the heat exchanger outlet temperature ST9 is less than 2° C./5 min., or the number of indoor units 5a~5c in operation has increased, it returns the processing to ST5. When satisfied (ST10—Yes), that is, when the heat exchanger outlet temperature Teo is equal to or lower than −6° C., and the drop rate of the heat exchanger outlet temperature ST9 is equal to or more than 2° C./5 min., and the number of indoor units 5a~5c in operation has not increased, it executes a defrosting operation preparation processing (ST11). The defrosting operation preparation processing is a processing to be performed by the CPU 210 when switching the refrigerant circuit 10 for performing a defrosting operation; and, as described above, the CPU 210 stops the compressor 21 and outdoor fan 26 and, as shown in FIG. 1A, switches the four-way valve 22 into a state shown by a broken line, that is, so that the ports a and b of the four-way valve 22 communicate with each other and the ports c and d communicate with each other. And, after ending the processing of ST11, the CPU 210 resumes the compressor 21 to start the defrosting operation (ST12).

Next, it checks whether a defrosting operation end condition is satisfied or not (ST13). The defrosting operation end condition is a condition which indicates that frost attached to the outdoor heat exchanger 23 is melted completely, for example, when the heat exchanger outlet temperature Teo input during the defrosting operation is 10° C. or higher, or when 10 minutes or longer have passed after start of the defrosting operation in ST12.

When not satisfied (ST13—No), it returns the processing to ST13 and continues the defrosting operation. When satisfied (ST13—Yes), it executes a heating operation resuming processing (ST14). The heating operation resuming processing is a processing to be performed by the CPU 210 when switching the refrigerant circuit 10 for returning the defrosting operation to the heating operation; and, the CPU 210, after stopping the compressor 21, as shown in FIG. 1A, switches the four-way valve 22 into a state shown by a solid line, that is, so that the ports a and d of the four-way valve 22 communicate with each other and the ports b and c communicates with each other. And, the CPU 210, after ending the processing of ST14, resumes the compressor 21 and outdoor fan 26 to resume the heating operation (ST15), thereby returning the processing to ST4.

Embodiment 2

Figure 3:
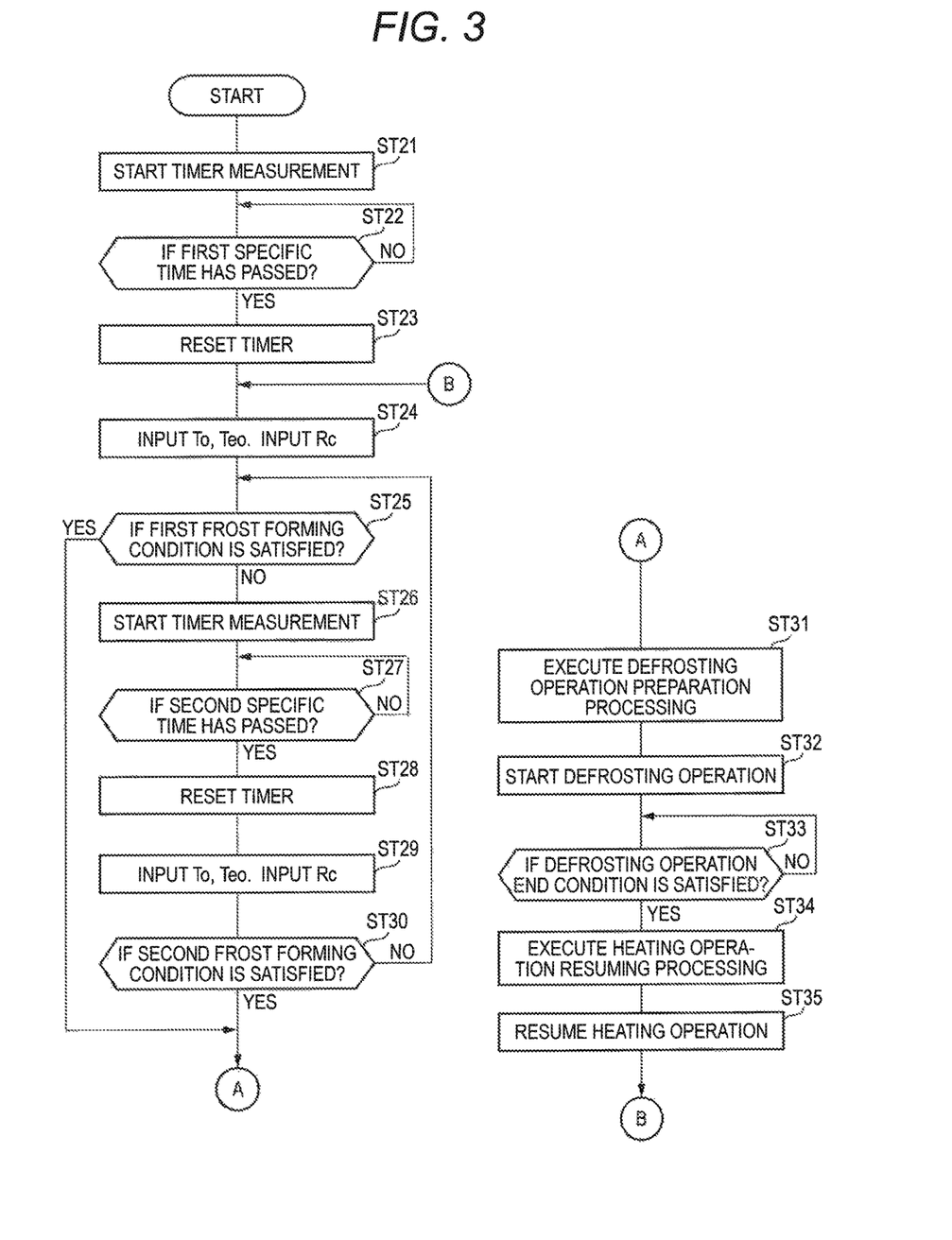
FIG. 3 is a flow chart of processings to be performed by the outdoor unit control unit in a heating operation according to another embodiment of the present invention.

Next, description is given of a second embodiment of the air conditioner of the invention using FIGS. 1A, 1B and 3. The structure and operation of the air conditioner of this embodiment are the same as the air conditioner of the first embodiment described by reference to FIGS. 1A and 1B, and thus the specific description thereof is omitted. This embodiment is different from the first embodiment in that, instead of checking whether the number of indoor units 5a~5c in operation in the second frost forming condition, the progress of sudden frost formation is detected by checking the increase rate of the number of rotations of the compressor 21.

As described in the first embodiment, when the number of indoor units 5a~5c in operation increases, the number of rotations of the compressor 21 greatly increases accordingly. And, when the number of rotations of the compressor 21 greatly increases, the suction pressure of the compressor 21 drops greatly, thereby increasing the drop rate of the heat exchange outlet temperature accordingly.

Therefore, the increase rate of the number of rotations of the compressor 21 when the number of indoor units 5a~5c in operation increases may be stored, that is, by conducting a test or the like, the increase rate of the number of rotations of the compressor 21 when the number of indoor units 5a~5c in operation increases may be previously obtained and may be stored as a specific increase rate in the memory part 220. Thus, by checking whether the increase rate of the number of rotations of the compressor 21 is equal to or lower than the specific increase rate, whether the number of indoor units in operation has increased or not can be checked. Here, as described above, even when the number of indoor units 5a~5c in operation increases only one, the number of rotations of the compressor 21 increases greatly. Thus, the specific increase rate may be an increase rate when the number of indoor units 5a~5c increases by one during the heating operation, for example, 20%. Also, since the number of rotations of the compressor 21 is stored in the memory part 220, at the same timing as the outside air and heat exchanger outlet temperature are input, the CPU 210 confirms whether the number of rotations of the compressor 21 has varied or not and, when varied, stores a new number of rotations after varied into the memory part 220.

Next, using a flow chart shown in FIG. 3, description is given of processings to be executed by the CPU 210 when the air conditioner 1 of the second embodiment of the invention performs a heating operation. In the flow chart of FIG. 3, ST expresses the steps of the processings and numerals following this express the numbers of the steps. Here, in FIG. 3, processings relating to the invention are mainly described, whereas the description of other processings, namely, general processings relating to the air conditioner 1, for example, control according to an operating condition instructed by a user during a heating operation is omitted. Also, in the following description, similarly to the first embodiment, the outdoor air temperature to be detected by the outdoor air temperature sensor 37 is expressed by To, the heat exchanger outlet temperature to be detected by the refrigerant temperature sensor 35 is expressed by Teo, and the number of rotations of the compressor 21 is expressed by Rc.

Here, in the flow chart of FIG. 3, since other processings than those of ST24, ST29 and ST30 are the same as those of the flow chart of FIG. 2 described in the first embodiment, the specific description thereof is omitted and thus only the processings of ST24, ST29 and ST30 are described.

After resetting a timer in ST23, the CPU 210 inputs through the sensor input part 240 the outdoor air temperature To detected by the outdoor air temperature sensor 37 and the heat exchanger outlet temperature Teo detected by the refrigerant temperature sensor 35, and also inputs the current number of rotations Rc of the compressor 21 from the memory part 220 (ST24). The CPU 210, when performing the processing of ST24, stores the thus-input the outdoor air temperature To, heat exchanger outlet temperature Teo and the number of rotations Rc of the compressor 21 together into the memory part 220.

The CPU 210 advances the processings of ST24 and following steps and, after resetting the timer in ST28, inputs through the sensor input part 240 the outdoor air temperature To detected by the outdoor air temperature sensor 37 and the heat exchanger outlet temperature Teo detected by the refrigerant temperature sensor 35, and also inputs the current number of rotations Rc of the compressor 21 from the memory part 220 (ST29). Here again, it stores the thus-input the outdoor air temperature To, heat exchanger outlet temperature Teo and the number of rotations Rc of the compressor 21 together into the memory part 220.

Next, the CPU 210 checks whether the second frost forming condition is satisfied or not (ST30). Specifically, it reads out the heat exchanger outlet temperature Teo stored into the memory part 220 in ST24 and ST29, and checks whether the heat exchanger outlet temperature Teo stored in ST29 is equal to or lower than −6° C. or not, whether the drop rate of the heat exchanger outlet temperature calculated using the heat exchanger outlet temperature Teo stored in ST29 and the heat exchanger outlet temperature Teo stored in ST24 is 2° C./5 min. or larger or not, and whether the increase rate of the number of rotations of the compressor 21 calculated using the number of rotations Rc of the compressor 21 stored into the memory part 220 in ST24 and ST29 is 20% or lower or not.

When not satisfied (ST30—No), that is, when the heat exchanger outlet temperature Teo is higher than −6° C. or the drop rate of the heat exchanger outlet temperature Teo is less than 2° C./5 min. or the increase rate of the number of rotations of the compressor 21 is higher than 20%, the CPU 210 returns the processing to ST25. When satisfied (ST30—Yes), that is, when the heat exchanger outlet temperature Teo is −6° C. or lower, and the drop rate of the heat exchanger outlet temperature Teo is 2° C./5 min or higher, and the increase rate of the number of rotations of the compressor 21 is 20% or lower, the CPU 210 executes a defrosting operation preparation processing (ST31).

The invention claimed is:
1. An air conditioner, comprising:
an outdoor unit including a compressor, a four-way valve, an outdoor heat exchanger, a heat exchanger outlet temperature detector for detecting a heat exchanger outlet temperature providing the temperature of a refrigerant flowing out from the outdoor heat exchanger when the outdoor heat exchanger functions as an evaporator, and an outdoor air temperature detector for detecting an outdoor air temperature;

a plurality of indoor units respectively including indoor heat exchangers;

a refrigerant circuit constituted of the compressor, the four-way valve, the outdoor heat exchanger and the indoor heat exchangers connected to each other by refrigerant pipes; and, a control unit for controlling the compressor and the four-way valve, wherein the control unit, while the plurality of indoor units are performing a heating operation with the refrigerant circuit set in a heating cycle, inputs periodically data comprising heat exchanger outlet temperatures detected by the heat exchanger outlet temperature detector, outdoor air temperatures detected by the outdoor air temperature detector and a number of the indoor units performing the heating operation, and stores the thus-input data in time series, and, when a first frost forming condition serving as a condition for frost formation in the outdoor heat exchanger is satisfied, switches the four-way valve to set the refrigerant circuit into a cooling cycle to thereby execute a defrosting operation for defrosting the outdoor heat exchanger, and, when a second frost forming condition serving as another condition for frost formation in the outdoor heat exchanger is satisfied, switches the four-way valve to set the refrigerant circuit into the cooling cycle to thereby execute the defrosting operation for defrosting the outdoor heat exchanger, wherein the first frost forming condition is satisfied when the heat exchange outlet temperature is lower than a first threshold temperature, when the duration of the heating operation is longer than a specific duration, or when a temperature difference between the outdoor air temperature and the heat exchanger outlet temperature is larger than a specific temperature difference, and wherein the second frost forming condition is satisfied when, from among the heat exchanger outlet temperatures stored in time series, a latest heat exchanger outlet temperature is lower than a second threshold temperature that is higher than the first threshold temperature, when a drop rate of the heat exchanger outlet temperature calculated using two continuing heat exchanger outlet temperatures of the heat exchanger outlet temperatures stored in time series is larger than a specific drop rate, and when the number of indoor units in operation has increased during calculation of the drop rate.

2. An air conditioner, comprising:

an outdoor unit including a compressor, a four-way valve, an outdoor heat exchanger, a heat exchanger outlet temperature detector for detecting a heat exchanger outlet temperature providing the temperature of a refrigerant flowing out from the outdoor heat exchanger when the outdoor heat exchanger functions as an evaporator, and an outdoor air temperature detector for detecting an outdoor air temperature;

a plurality of indoor units respectively including indoor heat exchangers;

a refrigerant circuit constituted of the compressor, the four-way valve, the outdoor heat exchanger and the indoor heat exchangers connected to each other by refrigerant pipes; and, a control unit for controlling the compressor and the four-way valve, wherein the control unit, while the plurality of indoor units are performing a heating operation with the refrigerant circuit as a heating cycle, inputs periodically data comprising heat exchanger outlet temperatures detected by the heat exchanger outlet temperature detector, outdoor air temperatures detected by the outdoor air temperature detector and a number of rotations of the compressor, and stores the thus-input data in time series, and, when a first frost forming condition serving as a condition for frost formation in the outdoor heat exchanger is satisfied, switches the four-way valve to set the refrigerant circuit into a cooling cycle to thereby execute a defrosting operation for defrosting the outdoor heat exchanger, and, when a second frost forming condition serving as another condition for frost formation in the outdoor heat exchanger is satisfied, switches the four-way valve to set the refrigerant circuit into the cooling cycle to thereby execute the defrosting operation for defrosting the outdoor heat exchanger, wherein the first frost forming condition is satisfied when the heat exchange outlet temperature is lower than a first threshold temperature, when the duration of the heating operation is longer than a specific duration, or when a temperature difference between the outdoor air temperature and the heat exchanger outlet temperature is larger than a specific temperature difference, and wherein the second frost forming condition is satisfied when, from among the heat exchanger outlet temperatures stored in time series, a latest heat exchanger outlet temperature is lower than a second threshold temperature that is higher than the first threshold temperature, when a drop rate of the heat exchanger outlet temperature calculated using two continuing heat exchanger outlet temperatures of the heat exchanger outlet temperatures stored in time series is larger than a specific drop rate, and when a rate of increase in the number of rotations of the compressor during calculation of the drop rate is smaller than a specific increase rate.

* * * * *